July 29, 1969  YOSHIMITSU UTO ETAL  3,457,960
LAMINATED HIGH PRESSURE CONTAINER HAVING RESISTANCE TO
HYDROGEN EMBRITTLEMENT
Filed March 23, 1967  4 Sheets-Sheet 1

INVENTORS
YOSHIMITSU UTO
TAIZO YAMAZAKI
BY TOSHIKAZU SHINKAWA

*McGlew & Toren*
ATTORNEYS

United States Patent Office 3,457,960
Patented July 29, 1969

3,457,960
LAMINATED HIGH PRESSURE CONTAINER HAVING RESISTANCE TO HYDROGEN EMBRITTLEMENT
Yoshimitsu Uto, Taizo Yamazaki, and Toshikazu Shinkawa, Hiroshima-ken, Japan, assignors to Mitsubishi Jukogyo Kabushiki Kaisha, Chiyoda-ku, Tokyo, Japan
Filed Mar. 23, 1967, Ser. No. 625,501
Int. Cl. F16l 9/14; F17c 1/10
U.S. Cl. 138—143   2 Claims

ABSTRACT OF THE DISCLOSURE

A pressure vessel for use in association with a hydrogen gas at elevated temperatures and pressures is comprised of a longitudinally elongated inner cylinder and a longitudinally elongated outer cylinder extending around the inner cylinder but being spaced radially outwardly therefrom. The inner cylinder comprises a low alloy steel containing from 0.2 to 4% of chromium and from 0.1 to 1½% molybdenum. A plurality of cylinders are formed by layers of carbon steel plates disposed around the inner cylinder. The plates are of varying dimension and are arranged one within the other and welded together. A circumferentially extending joint joins all of the cylinders and plates together. Detection holes extend radially through the laminated plates. The weld adjacent the inner cylinder is formed of a weld metal either wholly or partially made of austenitic high alloy steel which contains from 16 to 30% of chromium and 7 to 40% of nickel.

Brief summary of the invention

This invention relates, in general, to the construction of pressure vessels and, in particular, to a new and useful laminated high pressure container which can be protected against fine cracking, decarburization, embrittlement and other hydrogen defaults due to contact with hydrogen at elevated pressures and temperatures.

It is possible to preclude all hydrogen embrittlement to which pressure containers are subjected when they are employed for use in handling or storing high pressure, high temperature hydrogen gas, provided all of the steel materials used in fabricating the vessels are replaced by hydrogen-resistant alloys which resist attacks by hydrogen gas at elevated temperatures and pressures. However, such alloys are relatively expensive and they require great technical skill and heat treatment in welding and other working, all of which add to the manufacturing cost for such containers. The cost of such containers can be cut down considerably by employing hydrogen-resistant steel at locations where the surface of such materials will contact hydrogen, for example, on the interior of the cylinder. The less expensive steel such as carbon steel may then be employed as a laminate disposed around the inner cylinder. This is impractical, however, because when the outer plates are laminated to the inner cylinder, hydrogen is absorbed during the operation from the surface of the deposited weld metal exposed to the hydrogen atmosphere and it penetrates into the steel plates which constitute the laminate. Thus, even though the inner cylinder is formed of a hydrogen-resistant steel, there is a possibility of hydrogen embrittlement unless the laminate is formed by hydrogen-resistant steel plates.

In accordance with the present invention it was found that hydrogen embrittlement could be substantially eliminated by making at least the portion of the deposited weld on the side exposed to the hydrogen of a steel having a high chromium content or a steel resistant to hydrogen embrittlement. In this manner, the hydrogen absorbed by the surface of the weld which is exposed to the hydrogen atmosphere would penetrate little into the metal laminate. It has been found that the kind and thickness of such weld material which is necessary will depend on the partial pressure of the hydrogen and temperature which is to be employed in the vessel. In addition, it has been found that the use of a steel having some resistance to hydrogen for at least the laminated plates adjacent the side of the vessel which is exposed to the hydrogen atmosphere will provide a further insurance against hydrogen embrittlement.

Accordingly, it is an object of the present invention to provide a pressure vessel having resistance to hydrogen embrittlement which comprises a laminated cylinder drum made up of concentrically arranged inner and outer cylinders with cylindrical plates interposed in a plurality of layers therebetween which are welded to the inner and outer cylinders by a circumferential welded joint which is made of a deposited weld metal formed of a steel having high cromium content at least on the side facing the hydrogen atmosphere.

A further object of the invention is to provide a laminated pressure vessel in which a plurality of laminated plates are welded to an inner cylinder and an outer cylinder by weld metal having a resistance to hydrogen embrittlement and wherein there are detection or pressure equalizing holes extending substantially radially from the laminate plate adjacent the plate exposed to the hydrogen atmosphere through the plate surrounding the laminate at the opposite side and wherein the laminated plates may be made of carbon steel plates or preferably with one or more plates disposed on the side adjacent the hydrogen atmosphere which are made of hydrogen-resistant steel which is manufactured by adding not less than 0.1% of chromium and/or molybdenum to steel.

A further object of the invention is to provide a pressure vessel which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Detailed description

Figure 1:
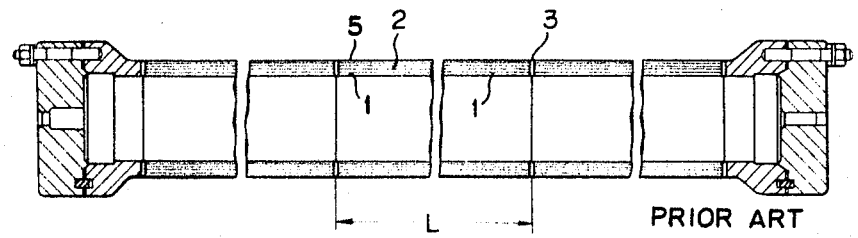
FIG. 1 is a sectional view of a pressure vessel constructed in accordance with the prior art.
Figure 2:
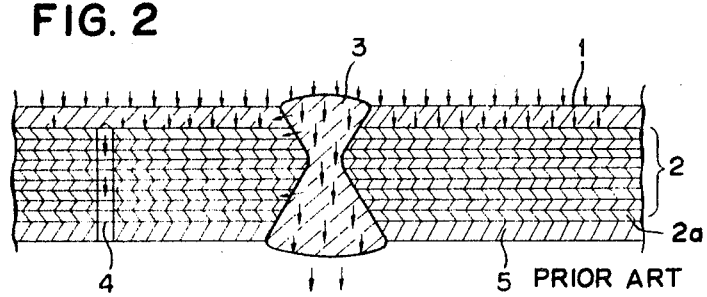
FIG. 2 is an enlarged sectional view of the vessel indicated in FIG. 1.

The prior art which is exemplified in the construction of vessel or container indicated in FIGS. 1 and 2 comprises a typical laminated high pressure container including an inner cylinder 1 and an outer cylinder 5 between which there is located a plurality of plates 2a of successively increasing dimensions from the interior to the exterior which are generally designated as a central laminate 2. The laminate 2 is of limited length L and it is welded to the inner and outer plates by means of circumferentially extending welded joints 3 formed at a plurality of longitudinally spaced locations along the length of the container. In a laminated high pressure container of the type described, the inner cylinder 1 and the laminate 2 are welded together in one piece. Therefore, even if the inner cylinder 1 is formed of a hydrogen-resistant steel, hydrogen is absorbed during the service operation from the surface of the deposited weld metal which is exposed to the side of the container having the hydrogen atmosphere and this hydrogen penetrates into the steel plates which constitute the laminate 2. Thus, there is a possibility of hydrogen embrittlement unless the laminate 2 is formed of hydrogen-resistant steel plates.

The above phenomenon will be described in more detail with reference to FIG. 2. In this figure, a detection hole or pressure equalizing passage 4 is indicated as extending through the outer cylinder 5 and through all of the plates of the laminate 2 to the inner cylinder 1. In the event that the inner cylinder 1 is broken, the detection hole 4 permits the operator to detect this condition by the issuance of a jet of the gaseous content through the hole 4. When there is hydrogen gas at an elevated pressure and at an elevated temperature inside the container, part of the hydrogen will be absorbed from the surface of the steel constituting the container and diffused into the steel. The hydrogen absorbed from the surface of the inner cylinder 1 permeates the wall of the inner cylinder 1 in the direction indicated by the arrows in FIG. 2. It then precipitates in the space between the inner cylinder 1 and the laminate 2 and is finally let out of the container through the detection hole 4. Since the pressure inside the space is kept at a level not higher than the atmospheric pressure by the presence of the hole 4, the steel plates constituting the laminate 2 can be protected against hydrogen embrittlement at locations spaced away from the welded joint 3. However, the portion of the hydrogen absorbed from the surface of the deposited metal 3 partially penetrates the metal and flows into the atmosphere while the rest of the hydrogen diffuses into the individual steel plates constituting the laminate 2, as indicated by the arrows in FIG. 2. Thus, it is necessary to use hydrogen-resistant steel not only in fabricating the inner cylinder 1 but also the steel plates which constitute the laminate 2 in order to prevent hydrogen embrittlement in the neighborhood of the welded joints. It is not desirable, however, because the manufacturing cost of the container is increased.

Figure 3:
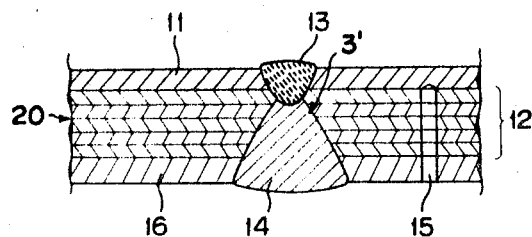
FIG. 3 is an enlarged sectional view of a pressure vessel constructed in accordance with the invention.

In accordance with the invention as indicated in FIG. 3, a container generally designated 20 is provided which includes an inner cylinder 11 which is made of 0.5% molybdenum steel. A laminate 12 of a plurality of plates is disposed between the inner cylinder 11 and an outer cylinder 16 and they are welded to both the inner and outer cylinders by means of a circumferentially extending weld generally designated 3' which is made up of an inner deposited metal 13 and an outer deposited metal 14. In accordance with a feature of the invention, the inner deposited metal 13 is made of 18% chromium and 8% nickel steel. A detection hole 15 extends from the outer cylinder 16 inwardly through the laminate 12 to the inner cylinder 11.

According to experiments conducted in accordance with the present invention, the diffusion rate of hydrogen and steel is inversely proportional to the chromium content of the particular steel and the rate in austenitic steel is far less than the rate in ferritic steel as will be seen from the following table.

Table 1.—Amounts of hydrogen passing through hydrogen probes (at a pressure of 100 kg./cm.$^2$ and a temperature of 340° C.)

| Type of steel: | Amount of hydrogen gas cc./cm.$^2$/hr. |
| --- | --- |
| Carbon steel | 0.41 |
| Mo steel (0.5%) | 0.39 |
| Cr steel (6%) | 0.24 |
| Cr steel (13%) | 0.15 |
| Stainless steel (18–8) | 0.01 |

Since the hydrogen embrittlement which will appear as a result of the deposited metal 14 and the laminate 12 will depend on the amount of hydrogen which is absorbed from the surface of the deposited metal 13 and which penetrates while being diffused throughout the deposited meal, it has been found that when the deposited metal 13 is formed of high alloy steel having a large content of chrominum which is highly resistant to the diffusion and penetration of hydrogen, it will serve as a barrier against the penetration of hydrogen and outstanding effects can be achieved against hydrogen embrittlement. In the embodiment of FIG. 3, the structure described is capable of handling hydrogen-containing gas having a hydrogen partial pressure of 100 kg./cm.$^2$ which is kept at a temperature of 340° C. The deposited metal 13 is formed of an 18–8 stainless steel which serves as a barrier against the hydrogen penetration and therefore the amount of hydrogen which diffuses and penetrates into the deposited metal 14 and the laminate 12 is decreased to about 3% of the amounts which would be true if the deposited metal were all of the type indicated at 14. Because of this, carbon steel can be used for the laminate 12 without any danger of hydrogen embrittlement, thus effectively cutting down the manufacturing cost of the container.

Figure 8:
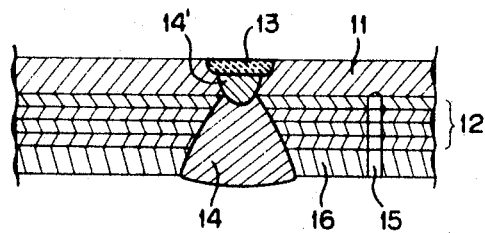
FIG. 8 is a view similar to FIG. 3 of still another embodiment of the invention.

The thickness of the deposited metal 13 may be selected optionally. For example, it may be thinner than the thickness of the inner cylinder 11, as shown in FIG. 8, with the remaining portions 14' and 14 being ordinary weld metal deposits.

Figure 6:
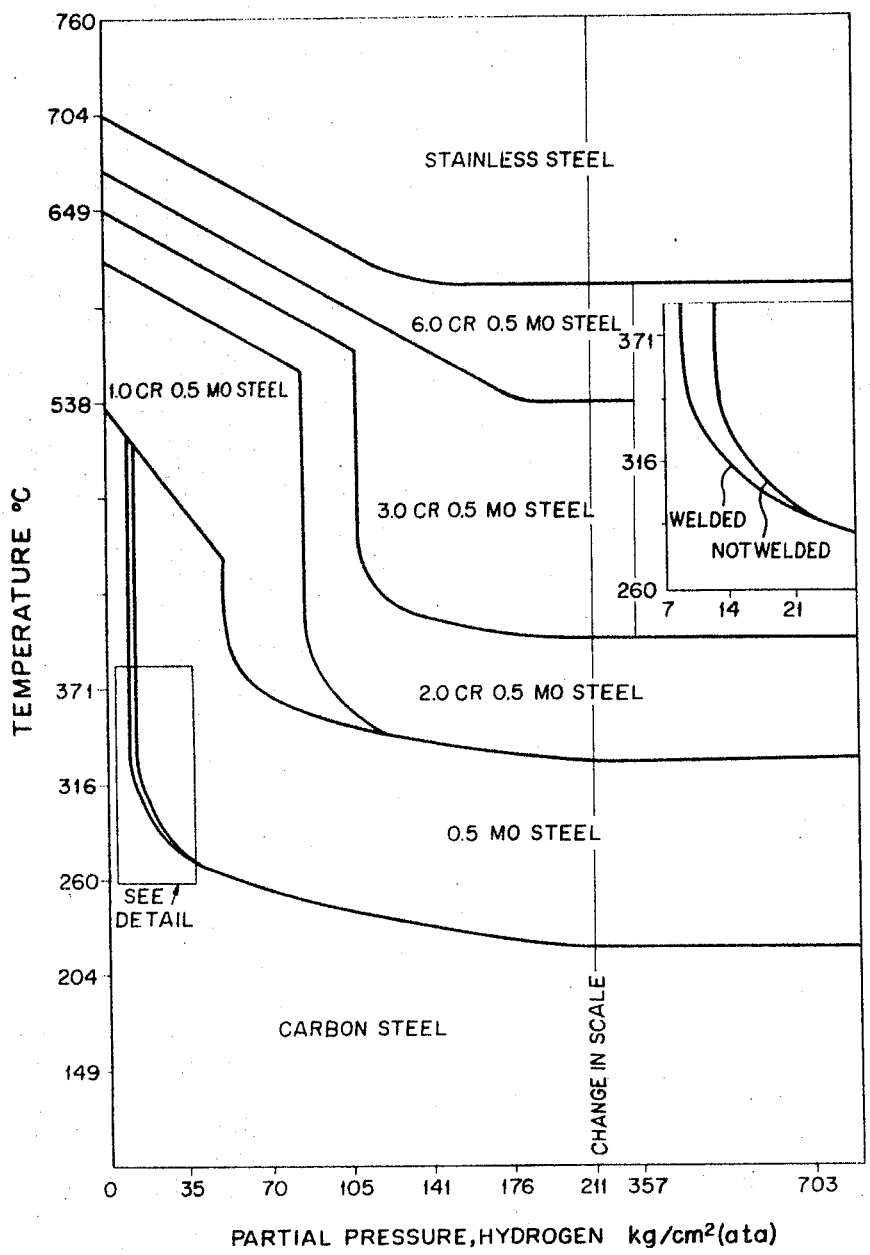
FIG. 6 is a Nelsons chart for selection of materials for prevention of hydrogen embrittlement.

By referring to the chart in FIG. 6, there is indicated a well known criteria for the selection of hydrogen-resistant steel at different hydrogen partial pressures and temperatures as proposed by Nelson. While the hydrogen embrittlement of steel depends on the concentration of hydrogen in the steel and on the temperature in the steel, the hydrogen in the steel in the vicinity of welded joints of a laminated high pressure container is that which has been absorbed from the surface of the deposited metal 13 and therefore the amount of hydrogen which diffuses and penetrates into the steel plates constituting the laminate 12 is a function of the distance from the inner surface of the container. The closer to the inner surface the container, the larger the hydrogen concentration.

Figure 7:
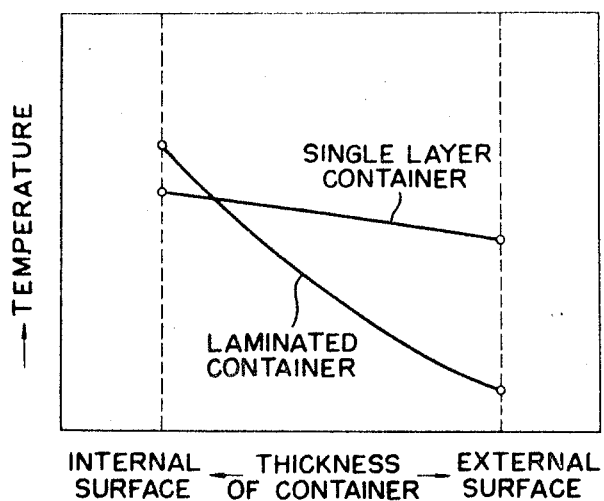
FIG. 7 is a graph showing the temperature distribution over the shell wall of a laminated high pressure container.

An example of temperature distribution over the wall of the laminated high pressure container is indicated in FIG. 7. As will be seen from this figure, the temperature rises proportionally to the distance toward the inner surface of the container. Accordingly, if the barrier action against the passage of hydrogen as proposed in the embodiment of FIG. 3 is insufficient, the hydrogen embrittlement of the laminate 12 can be completely prevented by the use of hydrogen-resistant steel at the location adjacent the portion of the cylinder which will be exposed to the hydrogen atmosphere, in this case the inner wall 11. The number of such plates will depend on the concentration and temperature of hydrogen diffusing and penetrating through the laminate 12.

Figure 4:
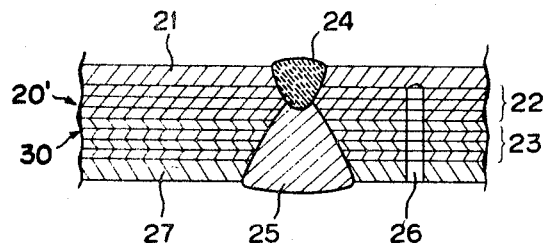
FIG. 4 is a view similar to FIG. 3 of another embodiment of the invention.

For example, in a container for handling hydrogen-containing gas having a hydrogen partial pressure of 100 kg./cm.$^2$ and a temperature of 340° C., there is provided a container generally designated 20', as indicated in FIG. 4. The container 20' includes an inner cylinder 21, a laminate generally designated 30 which is made up of an inner laminate section 22 of three separate plates and an outer laminate section 23 of four separate plates. In this embodiment, the inner cylinder 21 and the laminated section 22 of the laminate 30 may be formed of 0.5% molybdenum steel. The laminated section 23 may be formed of carbon steel if the deposited metal 24 is formed of a 13% chromium steel. For the deposited metal 25, either a carbon steel or a 0.2% molybdenum steel may be employed. In this embodiment, there is provided a detection hole 26 which extends from the exterior cylinder 27 through the two laminate sections 23 and 22 to the inner wall 21.

Figure 5:
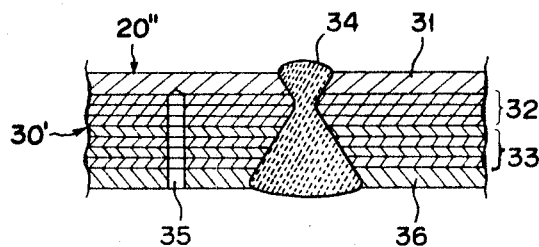
FIG. 5 is a view similar to FIG. 3 of still another embodiment of the invention.

In the embodiment indicated in FIG. 5, there is shown a container generally designated 20″ in which there is a weld formed by a deposit of metal 34 which is completely made of steel resistant to hydrogen embrittlement so that hydrogen diffusion is substantially prevented. In this case a laminate generally designated 30′ is formed with an inner laminate of three plate thickness 32 and an outer laminate of four plate thickness 33 disposed between an inner wall 31 and an outer wall 36. The layers 32 advantageously comprise 0.5% molybdenum steel and the rest, that is, the laminate section 33, may be formed of a 0.2% molybdenum steel.

Figure 9:
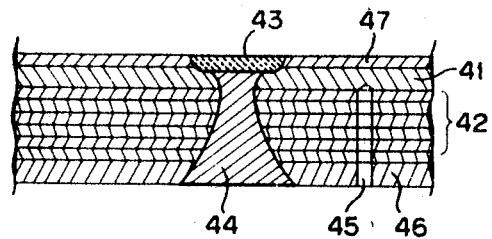
FIG. 9 is a view similar to FIG. 3 of a still further embodiment of the invention.

Throughout the above described embodiments, the inner cylinder, as a strength member, is made of a resistant material to hydrogen embrittlement. In these cases, it requires heat treatment after welding the inner cylinder as an alloy steel. In order to avoid these difficulties, a steel, not necessarily heat treated after welding, may be used to manufacture the inner cylinder. In this case, an inner barrier layer 47 made of a resistant material against hydrogen embrittlement may be installed inside an inner cylinder 41 as a strength member as shown in FIG. 9. A central laminate 42 is located between the inner cylinder 41 and an outer cylinder 46. A detection hole 45 extends from the inner cylinder 41 through the laminate 42 and the outer cylinder 46. The inner barrier layer 47 is made of a metal resistant to hydrogen embrittlement such as austenite stainless steel. The inner barrier deposited metal 43 at circumferential joint is welded with austenite stainless steel welding electrodes on the surface exposed to hydrogen and the remaining deposit material 44 is welded with carbon steel welding electrodes. The inner cylinder 41 as a strength member is made of carbon steel which is not largely hardened by the welding process. The inner barrier layer 47 may be formed by welding or by a clad process on the surface of the inner cylinder. The thickness of the barrier layer may be selected optionally.

Throughout the present specification the term "carbon steel" is used by way of simplification to refer broadly to steel having limited hydrogen resistance. It is intended to include not only pure carbon steel but also low alloy steel and high tension steel. The term "hydrogen-resistant steel" as herein used means steel manufactured by adding not less than 0.1% of chromium and/or molybdenum to steel, with the further addition of nickel, tungsten, titanium, vanadium, zirconium, niobium, cobalt and other special elements as are necessary for improving hydrogen-resistance tenacity and toughness of the metal in order to prevent or to minimize hydrogen embrittlement of the steel due to contact with hydrogen at elevated temperatures and pressures. The embodiments of the invention described herein have referred specifically to containers subjected to an internal pressure due to the presence of a high pressure, high temperature hydrogen gas. The containers according to the invention can be manufactured with entirely the same conception in cases where there is a high pressure, high temperature hydrogen gas disposed on the exterior of the container.

While specific embodiments of the invention have been shown and described in detail to illustrate the application of the inventive principles, it will be understood that the invention may be embodied otherwise without departing from such principles.

What is claimed is:

1. A pressure vessel for use in association with a hydrogen gas at elevated temperatures and pressures, comprising a longitudinally elongated inner cylinder, a longitudinally elongated outer cylinder extending around said inner cylinder but being spaced radially outwardly therefrom, said inner cylinder comprising a low alloy steel containing from 0.2 to 4% of chromium and from 0.1 to 1½% molybdenum, and a plurality of cylinder forming layers of carbon steel plates disposed around said inner cylinder between said inner cylinder and said outer cylinder, said plates being of varying dimension and arranged one within the other and welded together, a circumferentially extending joint joining all of said cylinders and said plates together, and detection holes extending radially through the laminated plates, the weld adjacent said inner cylinder being formed of a weld metal either wholly or partially made of austenitic high alloy steel containing from 16 to 30% of chromium and 7 to 40% of nickel.

2. A pressure vessel for use in association with a hydrogen gas at elevated temperatures and pressures, comprising a plurality of unit cylinders arranged one within the other, a plurality of cylinders forming intermediate plates arranged between said cylinders, a plurality of circumferentially extending welded joints joining said unit cylinders and said plates together, said unit cylinders comprising an inner cylinder made of a low alloy steel containing from 0.2 to 4% of chromium and from 0.1 to 1½% of molybdenum, a detection hole extending radially through said laminated plates, said circumferential welded joints being at least in a portion adjacent said inner cylinder, formed of a weld metal having at least a portion of ferritic high alloy steel containing 10 to 30% of chromium and wherein the portion adjacent the laminated plates is formed of a weld metal having a substantial portion made of carbon steel.

References Cited

UNITED STATES PATENTS

| | | | |
|---|---|---|---|
| 3,224,619 | 12/1965 | Maurin et al. | 220—3 |
| 3,231,338 | 1/1966 | Andrus | 220—3 X |
| 3,268,103 | 8/1966 | Nelson | 220—3 |
| 3,292,662 | 12/1966 | Nishi | 138—141 |
| 3,365,786 | 1/1968 | Takemura et al. | 220—3 X |

LOUIS K. RIMRODT, Primary Examiner

U.S. Cl. X.R.

220—3